Aug. 4, 1942.   S. H. COWIN   2,292,203
GENERATING ELECTRIC DRIVE AND CONTROL SYSTEM
Filed Oct. 11, 1941
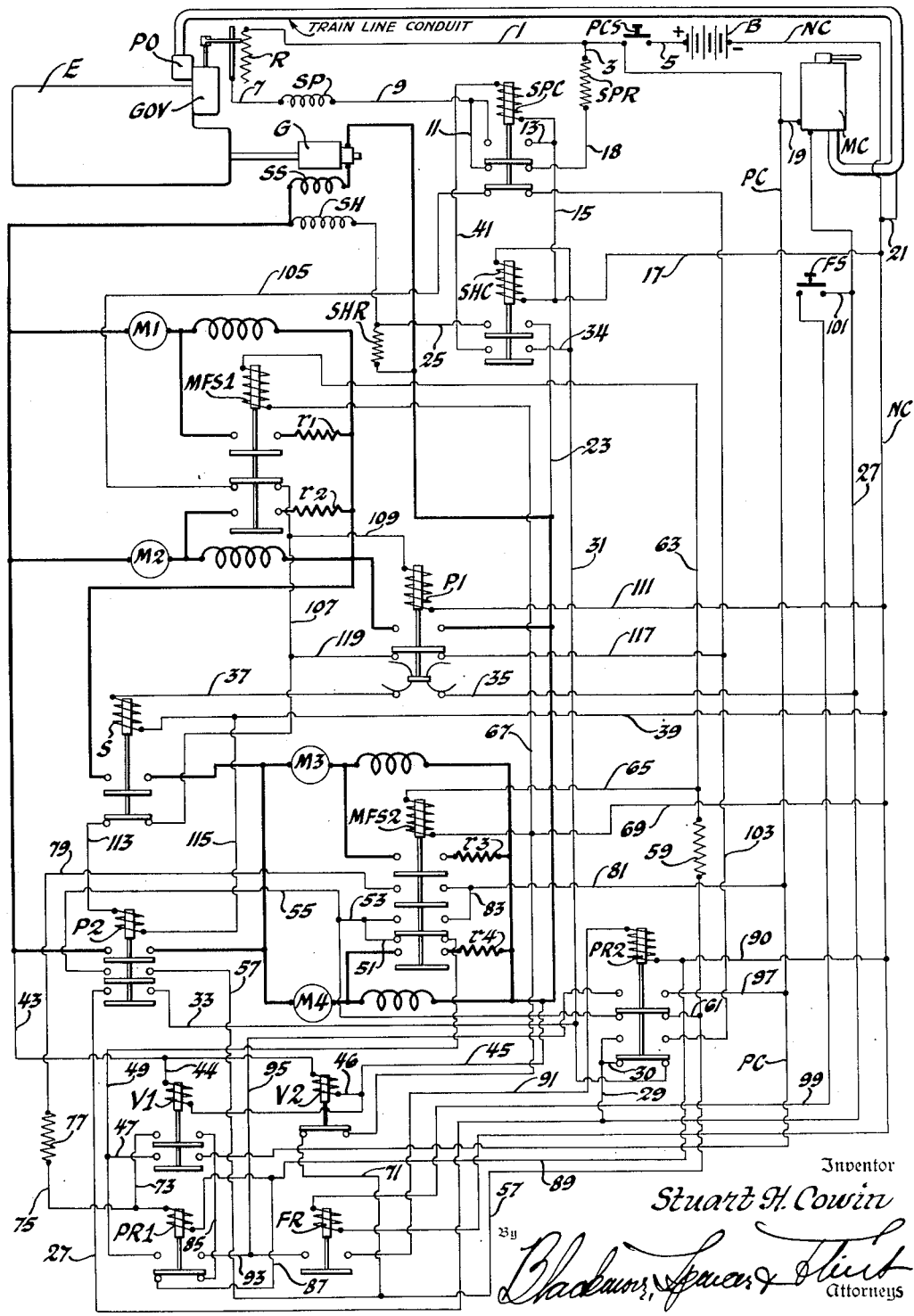
Inventor
Stuart H. Cowin
By
Blackmore, Spencer & Flint
Attorneys Patented Aug. 4, 1942

2,292,203

UNITED STATES PATENT OFFICE 2,292,203

GENERATING ELECTRIC DRIVE AND CONTROL SYSTEM

Stuart H. Cowin, Chicago, Ill., assignor to General Motors Corporation, Detroit, Mich., a corporation of Delaware Application October 11, 1941, Serial No. 414,565

11 Claims. (Cl. 290—17)

The present invention relates, generally, to generating electric traction and control systems and more particularly to improvements in such systems and the automatic controls therefor to adapt these systems for use on locomotives of the generating electric type which are subjected to widely variable speeds and loads.

On locomotives of this type, where a number of traction motors are geared to respective driving axles and are supplied with power from a prime mover generator power plant, it is the usual practice to provide manually operated or automatic control means for connecting the motors in series relation with the power plant generator for obtaining high starting torque and for changing from the series to the parallel motor connection for obtaining high speed characteristics from the motors. The conventional control means usually includes means for causing a reduction in the power plant output when the motor connections are changed in order to reduce the current surge and corresponding torque surge resulting from the difference in the electrical constants for these particular motor connections.

It has been found by providing automatic voltage responsive control means which acts at definite values of generator voltage corresponding to definite values of motor and locomotive speed for causing the motor field windings to be shunted when the motors are connected in either a series or parallel relation with the generator of the locomotive power plant, and for automatically changing the motor connection relations between the series and parallel relations, that the speed and torque range of the motors may be materially increased for each connection relation, and the current and torque surges may be materially decreased upon a change in these relations, thereby preventing overloading of the power plant and motors and reducing the torque surges thereon and the shocks resulting from these torque surges which are imparted to the locomotive and train pulled thereby. This constitutes the principle object of my invention.

The means by which the above object is accomplished and other features of my system will be better understood by reference to the following detailed description and the single accompanying drawing illustrating my improved generating electric traction and control system and the electrical connections therefor in diagrammatic form, as arranged for use on generating electric locomotives for which my system is particularly adapted.

Referring now to the drawing, the locomotive power plant includes a prime mover illustrated as a Diesel engine E and an electrical generator of the compound type driven thereby shown generally at G. The engine is provided with any well known type of governor GOV, driven thereby, which acts in response to variations in the speed and load of the power plant to adjust the amount of fuel supplied to the engine to vary the torque, speed and output thereof and also to actuate a generator field rheostat R to vary the generator excitation and therefore the generator output to vary the load on the engine in order to cause the engine-generator power plant to operate at substantially constant speed and output in a well known manner. The governor is provided with any well known type of speed setting means, not shown, whereby the power plant may be caused to operate at any one of a number of constant values of speed, torque, load and output. Any well known type of power operated remotely controlled means shown at PO is provided to vary the setting of the governor speed setting means. Any type of power operated means which may be controlled remotely may be used. Electromagnetic power operated means is shown having the usual train line control conductors connected thereto carried in a train line conduit which is shown extending between the power operated means PO and a master controller MC.

The master controller MC is of a well known type and is provided with a suitable control handle which is movable to a number of control positions for controlling the power operated means PO for causing adjustment of the governor speed setting means and for causing initial energization of a contactor S, which serves to initially connect the traction motors in series relation with the generator when the speed and output of the power plant is increased above a low or idle value, which then causes operation of the automatic control means, to be subsequently described.

The electrical power system includes the compound generator G, a number of traction motors of the series type shown at M1, M2, M3 and M4, and power conductors and connections shown in heavy lines on the drawing extending therebetween. As shown, the motors M1 and M2 are permanently connected in parallel by certain of these power conductors, as are the motors M3 and M4. Also included in these power connections are the series contactor S and parallel contactors P1 and P2 which when energized connect each pair of motors in either a series or parallel relation with the generator in a well known manner.

Motor excitation varying means or field shunting means comprising the contactors MFS1 and MFS2 and shunting resistors r1 to r4 are also provided. Each of these contactors includes an electromagnet actuating winding and an armature having a number of contacts fixed thereon and a number of pairs of fixed contacts. The upper and lower pair of fixed contacts of each contactor are shown connected in series with a respective shunting resistor across a respective motor series field winding so that upon energization of the contactor windings each of the upper and lower pairs of fixed contactors will be bridged by armature contacts when the armature is attracted and moved upward from the position shown upon energization of the contactor windings. Bridging of these contacts causes each motor field winding to be shunted by a respective resistor to reduce the excitation of the motors and therefore cause a reduction in the motor C. E. M. F., which causes an increase in the generator current supplied to the motors so that the speed and torque range of the motors is increased materially.

As will be explained later, energization of the windings of each of the motor field shunting contactors MFS1 and MFS2 is accomplished by automatic means which also causes transition of the motor connection relations with respect to the generator, that is, from the series to the parallel relation, by simultaneously causing de-energization of the winding of the series contactor S and energization of the windings of the parallel contactors P1 and P2. This automatic means causes the shunting contactors to operate for either the series or parallel motor connection relations to cause an increase in the speed and torque range of the motors for each motor connection relation. The other pairs of contacts on the field shunting contactors and the series and parallel contactors are interlocking and control contacts and the connections to these contacts and the windings of these contactors will be described later.

The excitation system of the generator includes separately, shunt and series excited excitation circuits. The separately excited circuit includes the previously mentioned field rheostat R, a field winding SP, a field discharge resistor SPR and a contactor SPC which when energized, disconnects the discharge resistor and connects the rheostat and field winding to a battery B to cause normal excitation of the field winding, the excitation current being then limited only by the rheostat R, which, as explained before, is operated by the governor GOV. Upon de-energization of the contactor SPC the field winding SP is simultaneously disconnected from the battery and the discharge resistor connected thereacross. The field winding SP supplies the major portion of the generator excitation, and when it is de-energized the generator voltage is reduced to a negligible value and therefore the power output also is reduced to a negligible value. As will be subsequently described, this action occurs simultaneously with the transfer of the motor connections from the series to the parallel connection relation by action of automatic control means, to be described. The discharge resistor SPR, when connected across the winding SP and when this winding is disconnected from the battery, serves to limit the resulting induced voltage therein and prevent damage thereto. The contactor SPC includes an electromagnetic winding, an armature attracted thereby having contacts fixed thereon and three pairs of fixed contacts, the lower pair being interlocking and control contacts to be referred to later.

The connections between the rheostat R, field winding SP, field discharge resistor SPR and contactor SPC to accomplish the above described operation will now be described. The upper terminals of the rheostat R and discharge resistor SPR are shown connected by conductors 1 and 3 to one contact of a positive control switch PCS, and a positive control conductor PC is also connected to this switch contact and will be referred to later. The other contact of the switch PCS is connected directly to the positive terminal of the battery B by a conductor 5, and a negative control conductor NC is shown connected to the negative battery terminal and will also be referred to later. The lower terminal of the rheostat R is connected by a conductor 7 to one terminal of the generator field winding SP, the other terminal of which is connected to the left upper and central fixed contacts of the contactor SPC by conductors 9 and 11. The lower terminal of the winding and the right upper fixed contact of the contactor SPC are connected by conductors 13 and 15 to a conductor 17 shown connected between the lower terminal of the winding of a relay SHC and the negative control conductor NC. The right fixed central contact of the contactor SPC is connected by a conductor 18 to the lower terminal of the discharge resistor SPR. A conductor 19 is shown connected between the positive control conductor PC and the master controller MC, and a common negative conductor 21 for the power operated means PO is connected to the negative control conductor NC, and is shown extending into the train line conduit.

The shunt excitation circuit includes the shunt field winding SH, a field discharge resistor SHR connected in series with this winding, and a contactor SHC which, when energized, shunts out the discharge resistor to allow normal values of excitation current to flow therein. When the contactor SHC is de-energized it causes the discharge resistor to be connected in series with the field winding to materially reduce the current flow therein and accordingly reduce the generator voltage and output. The windings of both the contactors SPC and SHC are automatically de-energized to cause the voltage and output of the generator to be reduced to a negligible value when transition of the motor connections occurs in response to operation of the automatic control means, to be described. This operation prevents excessive current surges in the power connections, generator, and motor windings, and hence torque surges on the locomotive power plant, traction motors, and means operated thereby. The contactor SHC includes an electromagnetic winding, an armature movable thereby having contacts fixed thereto and two pairs of fixed contacts. The connections between this contactor and the shunt field winding SH and discharge resistor for accomplishing the above described operation are as follows:

The shunt field winding SH and field discharge resistor SHR are shown connected in series across the power circuit. One of the upper fixed contacts of the contactor SHC is connected by a conductor 23 to the same side of the power circuit that one terminal of the discharge resistor is connected to, and the other terminal of the discharge resistor is connected to a conductor 25, which is connceted between the upper left fixed contact of contactor SHC and one terminal of the winding SH. The other terminal of this winding is connected to the other side of the power circuit. The connections to the lower pair of fixed contacts and upper winding terminal of the contactor will be described subsequently.

The generator series excitation circuit includes only the series field winding, shown connected in conventional manner in the power circuit.

The automatic control means, previously mentioned, acts automatically in response to definite values of generator and motor voltages corresponding to definite values of motor speed and load to control the above mentioned contactors which, as will be described, are connected by control, interlocking, and holding connections to cause the following automatic sequence of changes in the motor connections and the motor and generator excitation varying means to increase the speed and torque range of the motors at values of speed and voltage necessary to prevent overloading of the generator and motors and to prevent current and torque surges thereon when these changes occur when the locomotive speed increases:

1. Automatic change in the motor connections from a series relation to a series-shunt connection, that is, with the motors in series relation with the generator and the motor fields shunted. This change takes place when the voltage rises to a value of 850 volts corresponding to a locomotive speed of 18 M. P. H.

2. Automatic change of the motor connections from the series-shunt to a parallel relation and a simultaneous reduction in the generator output to a negligible value. This change takes place at a voltage of 850 volts corresponding to a locomotive speed of 31 M. P. H.

3. Automatic change of the motor connections from a parallel relation to a parallel-shunt relation, that is, with the motors connected in parallel and the motor fields shunted. This change takes place at a voltage of 850 volts corresponding to a locomotive speed of 50 M. P. H.

When the locomotive speed decreases with the motors connected in parallel-shunt or series-shunt relation, the following automatic changes in the motor connections take place at 600 volts:

Automatic change of the motor connections from the parallel-shunt connection back to the straight parallel relation occurs when the voltage and speed of the locomotive decrease from a maximum value to a value of 600 volts corresponding to a speed of 45 M. P. H.

Automatic change of the motor connections from the series-shunt to the straight series relation takes place when the voltage and speed decrease to a value of 600 volts corresponding to a speed of 12 M. P. H. The above described automatic operation is controlled by voltage responsive relays shown at V1 and V2 and control relays shown at PR1 and PR2. These relays are interconnected and serve to set up and complete holding circuit connections to the previously mentioned contactors to accomplish the above operating sequence and accordingly serve as a counting relay system, as will be described later. The electrical constants of relay V1 are such that it closes at 850 volts and opens at 750 volts, and the constants of relay V2 are such that it closes at 700 volts and opens at 600 volts. A forestalling relay shown at FR controlled by a manually operable forestalling switch FS is provided to prevent operation of the relay PR2, which controls energization of the contactors P1 and P2 to prevent transition of the motor connections to the parallel connection relation when it is desired to obtain low speed and high torque motor characteristics by causing the motors to be retained in a series relation with the generator. Transition of the motor connections from the parallel to the series relation is accomplished manually by opening the forestalling switch FS.

Each of the above relays includes an actuating winding, an armature, having contacts fixed thereon, which is attracted and moved upward to the closed position from the open position in which it is shown, and fixed contacts which are bridged and opened by movement of the armature contacts. The control, interlocking and holding connections connecting the relays and contactors will now be described in detail.

As previously explained, the master controller is connected to the positive control conductor PC by a conductor 19, and control conductors extending from the controller to the power operated means PO are carried in the train line conduit, whereby energization of the power operated means is connected to the positive battery; and a common return conductor 21 carried in the train line conduit is shown connected to the negative control conductor NC. A motor control conductor 27 is also connected between the master controller and the lower left fixed contact of the parallel contactor P2. The two lower left fixed contacts of the relay PR2 are connected by conductors 29 and 30 to the motor control conductor 27. The right lower fixed contact of the relay PR2 is connected by a conductor 31 to the upper winding terminal of the contactor SHC. The left lower fixed contacts of the contactors P2 and SHC are connected, respectively, by conductors 33 and 34 to the conductor 31. A conductor 35 is connected between the right lower fixed contact of the contactor P1 and the motor control conductor 27 and the left lower fixed contact of contactor P1 is connected by a conductor 37 to the upper winding terminal of the series contactor S, the lower winding terminal of which is connected by a conductor 39 to the negative control conductor NC.

The contact arrangement of the master controller, as has been previously explained, allows energization of the series contactor winding to cause closure of this contactor when the controller handle is moved to any control position, which causes the power operated means to cause operation of the power plant at values of speed and output above those obtained at idling speed. When the controller handle is moved to any of these positions the motor control conductor 27 is connected to conductor 19, which is connected to the positive control conductor PC through suitable controller contacts, not shown. The series contactor winding will, accordingly, be energized through the bridged lower contacts of the contactor P1 and conductors 27, 35, 37, 39 and negative control conductor NC, and the series contactor S will close to connect the motors M1 to M4 in a series power circuit relation with the generator G. The winding of the contactor SHC will also be simultaneously energized through the bridged lower contacts of the relay PR2 and conductors 27, 29, 30, 31, 17 and negative control conductor NC. The contactor SHC will close to bridge the lower pair of fixed contacts, one of which is connected by a conductor 34 to the conductor 31, and the other contact is connected by a conductor 41 to the upper winding terminal of the relay SPC. The other terminal of relay SPC, as previously mentioned, is connected to the negative control conductor NC by the conductors 15 and 17. The armature of the contactor SPC will, accordingly, be attracted and moved upward to the closed position. When the contactors SHC and SPC are closed the generator excitation current in both the shunt and separately excited generator field windings SH and SP will be at normal values, as has been previously explained, and the motors will be connected in series relation with the generator.

It will, therefore, be evident that if the controller handle is moved to a position where the power operated means PO is caused to adjust the governor speed setting means so that the power plant is caused to operate at constant maximum speed, load and output, constant power input will be supplied to the traction motors and they will exert maximum starting torque to drive the locomotive as they are then connected in series relation with the generator.

It is well known that for constant values of power input to series motors and variable loads and speeds thereon the motor voltage vs. motor current curve is an equilateral hyperbola and the voltage is proportional to speed and the motor current is proportional to the motor torque. The torque and current are inversely proportional to speed.

The automatic means by which the motor power connections are changed and by which the motor and generator excitation is controlled acts in response to these variations in the generator voltage applied to the motors when the motors are connected in different relations with the generator, and these variations in voltage correspond to variations in the speed of the motors and locomotive. The automatic means, as previously mentioned, comprises the voltage relays V1 and V2 and control relays PR1 and PR2, serving as a counting relay system.

The windings of the voltage relays V1 and V2 are connected in parallel across the power circuit by conductors 43, 44, 45 and 46. The positive control conductor PC is connected to the right lower fixed contact of the relay V1, and the left lower fixed contact is connected by a conductor 47 to a conductor 49, which is connected between the left fixed contact third from the bottom of the contactor MFS2 and a conductor 55 shown connected between the left fixed contact second from the top of the relay PR2 and the left fixed central contact of the contactor P2. The right fixed central contact of the contactor P2 is connected by a conductor 57 to one terminal of a resistor 59, and a conductor 61 is connected between the conductor 57 and the right fixed contact second from the top of the relay PR2. The other terminal of the resistor 59 is connected by a conductor 63 to the upper terminal of the winding of the contactor MFS1, and a conductor 65 is connected between the conductor 63 and the upper terminal of the winding of the contactor MFS2. The lower terminal of the winding of the contactor MFS1 is connected to the right fixed contact of the relay V2 by a conductor 67, and a conductor 69 is connected to the conductor 67 and the negative control conductor NC and also to the lower terminal of the winding of the contactor MFS2. The left fixed contact of the relay V2 is connected to the conductor 67 by a conductor 71.

It will be seen that the fixed contacts of the relay V2 are connected across the windings of both the motor field shunting contacts, and when these contacts are bridged by the relay armature contact these contactor windings are shunted and cannot be energized until the winding of relay V2 is energized to attract and move the armature upward out of bridging relation with the fixed contacts and open this shunt connection across the windings of the motor field shunting contactors MFS1 and MFS2, which comprises the conductors 67, 71 and 63.

The following connections permit the relays V1 and PR1 to act as a counting relay system, as previously mentioned. The left upper fixed contact of the relay V1 is connected by a conductor 73 to a conductor 75 which is connected between the upper terminal of the winding of the relay PR1 and one terminal of a resistor 77, the other terminal of which is connected by a conductor 79 to the left fixed contact second from the top of the contactor MFS2. The right fixed contacts second and third from the top of the contactor MFS2 are connected by conductors 81 and 83 to the positive control conductor PC. The right upper fixed contact of the relay V1 is connected by a conductor 85 to the right lower fixed contact of the relay PR1, and the left lower fixed contact of this relay is connected by a conductor 87 to a conductor 89 which is connected between the lower terminal of the winding of the relay PR1 and a conductor 90 connected between the lower terminal of the winding of the relay PR2 and the negative control conductor NC. The upper terminal of the winding of the relay PR2 is connected by a conductor 91 to one of the fixed contacts of the forestalling relay, the other fixed contact of which is connected to the right upper fixed contact of the relay PR1 by a conductor 93. A conductor 95 is connected between the conductor 93 and the upper left fixed contact of the relay PR2, the upper right fixed contact of which is connected to the positive control conductor PC by a conductor 97.

It will be noted that the lower winding terminal of the forestalling relay FR is connected to the negative control conductor NC, and the upper winding terminal is connected by a conductor 99 to one terminal of a manually operable forestalling switch FS, the other terminal of which is connected by a conductor 101 to the motor control conductor 27. These connections permit the forestalling relay winding to be energized only when the forestalling switch FS is closed to permit energization of the winding of the relay PR2, which controls energization of the parallel contactors P1 and P2 to permit the automatic control means to cause the motor connections to be automatically changed from the series connection relation to the parallel connection relation, as previously described.

Energization of the parallel contactors P1 and P2 takes place when the relay PR2 is energized and closed through the following conductors: The right fixed contact second from the bottom of relay PR2 is connected by a conductor 103 to the right lower fixed contact of the contactor SPC, the left lower fixed contact of which is connected by a conductor 105 to the left central fixed contact of the contactor MFS1. The right central fixed contact of the contactor MFS1 is connected by a conductor 107 to the right lower fixed contact of the series contactor S, and a conductor 109 is connected between the conductor 107 and the upper winding terminal of contactor P1, the lower winding terminal of which is connected by a conductor 111 to the negative control conductor NC. The left lower fixed contact of the series contactor S is connected by a conductor 113 to the upper winding terminal of the parallel contactor P2, and the lower winding terminal of the contactor P2 is connected by a conductor 115 to the conductor 39, which is connected to the negative control conductor NC. The central pair of fixed contacts of the parallel contactor P1 are connected by conductors 117 and 119 between the conductors 103 and 107.

*Automatic operation for increasing speed of the locomotive*

Assume that the master controller handle has been moved to a position corresponding to maximum speed, load and output setting of the power plant by the power operated means PO and that the forestalling switch FS is also closed. As previously explained, with the controller in this position the contactors S, SHC and SPC are closed to cause a constant maximum value of power to be supplied to the motors, which are then connected in series relation with the generator so that they operate at maximum torque and low speed.

The locomotive will accordingly start, and the speed of the motors and locomotive will increase and the motor C. E. M. F. and generator voltage will increase, causing the generator current to decrease. With the forestalling switch FS closed the forestalling relay winding will be energized through conductors 27, 101, 99 and NC, and this relay will also close.

When the generator voltage increases to a value of 700 volts the voltage relay V2 will close to open the shunt connection across the windings of the motor field shunting contactors MFS1 and MFS2, as described above. Upon a further increase in the speed and voltage the voltage relay V1 will close at 850 volts, or at a locomotive speed of 18 M. P. H., which causes energization and closure of the motor field shunting contactors MFS1 and MFS2. Energization of the windings of these contactors takes place through the following conductors and the bridged contacts: Positive control conductor PC, the bridged lower fixed contacts of relay V1, conductors 47 and 49, the bridged contacts second from the bottom of contactor MFS2, conductors 51, 53 and 55, the bridged fixed pair of contacts second from the top of relay PR2, conductors 61 and 57, resistor 59, and conductors 63, 65, 67, 69 and negative control conductor NC. The resistor 59 is provided to limit the current in this circuit to a safe value. The shunting contactors MFS1 and MFS2 will close upon energization of the windings thereof and cause the shunting resistors r1 to r4 to be connected in shunt across the respective series field windings of the motors M1 to M4 to decrease the C. E. M. F. of the motors, which causes an increase in the current supplied to the motors by the generator and therefore an increase in the motor torque and speed range and a decrease in the generator voltage to a value less than 750 volts, which causes the armature of the voltage relay V1 to drop down. Dropping of this armature does not cause de-energization of the windings of the contactors MFS1 and MFS2 as a holding circuit is established when the contactor MFS2 closes through the bridged pair of fixed contacts third from the bottom to these contactor windings through the following conductors: Positive control conductor PC, conductors 81, 83, 53 and 55, the bridged fixed contacts second from the top of relay PR2, conductors 61, 57, resistor 59, conductors 63, 65, 67, 69 to the negative control conductor, and the motors M1 to M4 will accordingly be maintained in the series-shunt connection relation.

Upon closure of the contactors MFS2 a circuit will also be established throught the bridged pair of fixed contacts second from the top of this contactor from the positive control conductor PC through conductors 81 and 79, resistor 77, conductors 75 and 73, bridged upper contacts of relay V1, conductor 85, bridged lower contacts of relay PR1 and conductors 87, 89 and 90 to the negative control conductor. The resistor 77 is placed in the above circuit to limit the current therein to a safe value. It will be evident that as long as the relay V1 is closed and PR1 is open, as shown, the winding of the relay PR1 is shunted by the bridge upper fixed contacts of relay V1 and bridged lower fixed contacts of relay PR1 and conductors 73, 85 and 87, but when the relay V1 opens again at 750 volts, the winding of the relay PR1 will be energized and close, as the above described shunt circuit established around the winding of relay PR1 will be opened when the upper pair of fixed contacts of this voltage relay are opened after the motor series-shunt power connection relation is completed. Energization and closure of the relay PR1 takes place upon closure of the contactor MFS1 and opening of the relay V1 through conductors NC, 81, 79, resistor 77, conductors 75, 89, 90 and NC. Closure of relay PR1 sets up a circuit connection which is completed when the voltage relay V1 closes a second time through the bridged lower contacts of the relay V1, the bridged upper contacts of the relay PR1 and bridged contacts of the forestalling relay FR to the winding of the relay PR2, which will now be described, to cause transition of the motor connections between the series-shunt and parallel connection relation with the generator.

When the voltage again increases to a value of 850 volts corresponding to a locomotive speed of 31 M. P. H. with the motors connected in series-shunt power relation with the generator, the voltage relay V1 will close a second time to cause energization of the winding of the relay PR2 through the circuit connection set up, mentioned above, which includes the following conductors: Positive control conductor PC, conductors 47, 49, 93, 91, 90 and negative control conductor NC. The armature of the relay PR2 will accordingly be attracted and moved upward to the closed position in which the upper pair of fixed contacts and the pair of fixed contacts second from the bottom will be bridged and the lower pair of fixed contacts and the pair of fixed contacts second from the top will be opened simultaneously.

Bridging of the upper pair of fixed contacts of the relay PR2 establishes a holding circuit to the winding of this relay through conductors PC, 97, 95, 93, 91, 90 and negative control conductor NC as the forestalling relay FR is closed.

Opening of the fixed contacts second from the top of relay PR2 breaks the connection between conductors 55 and 61 through which the windings of the motor field shunting contactors MFS1 and MFS2 are energized, and the armatures thereof with drop to the position shown. Upon the opening of the two pairs of fixed contacts second and third from the top of the contactor MFS2 the energizing connection to the winding of relay PR1 comprising conductors 81 and 79 and also conductors 83 and 53 will be broken, and the armature of the relay PR1 will drop to the position shown.

Opening of the lower pair of fixed contacts of the relay PR2 breaks the connection between the conductor 31 and conductors 29 and 30 through which the winding of the contactor SHC is energized, causing it to open and thereby opening the connection between conductors 34 and 41 through which the winding of the contactor SPC is energized, and this contactor will also open. With the contactor SHC open the discharge resistor SHR will be connected in series relation with the generator shunt field winding to reduce the excitation current therein and the generator output will be reduced, and with the contactor SPC open the generator separately excited field winding SP will be disconnected from the battery B and the discharge resistor SPR will be connected across the winding. The generator voltage and power output will, accordingly, be reduced to a negligible value by the opening of both of the contactors SHC and SPC, and the voltage relays V1 and V2 will accordingly open.

Bridging of the fixed contacts second from the bottom of the relay PR2 causes energization of the winding of the parallel contactor P1 through these bridged contacts, the bridged contacts of the contactor SPC and the bridged pair of central fixed contacts MFS1 through the following conductors: 27, 29, 103, 105, 107, 109, 111 and negative control conductor NC to cause the armature of the contactor P1 to be attracted and moved upward. Initial upward movement of this armature causes the central pair of fixed contacts to be bridged and also to retain the lower pair of fixed contacts bridged until the upper pair of fixed contacts are bridged. The two lower pairs of contacts are flexible and formed as shown to accomplish this action: Bridging of the central pair of contacts establishes a holding circuit, comprising conductors 27, 117, 119, 107 and 109, to the winding of contactor P1, and when the upper pair of power contacts of this contactor are bridged by further movement of the armature the lower pair of contacts will then be opened to break the energizing circuit to the winding of the series contactor S comprising conductors 35 and 37, and its armature will accordingly drop to the position shown. With the armature of contactor S in the position shown the lower pair of interlocking contacts will be bridged to cause energization of the winding of contactor P2 through conductors 117, 119, 107, 113, 115 and 39 to cause upward movement of its armature and bridging of the upper pair of power contacts and both pairs of interlocking contacts to establish the parallel power circuit relation of the motors with respect to the generator. It will be evident that by preventing the series contactor S from opening before the parallel contactor P2 closes, by providing flexible contacts on the armature of the contactor P1 the power circuit is not opened during transition of the motor connections, thereby preventing arcing and burning of the contacts of these contactors.

Upon the completion of the parallel motor power connection by opening of the series contactor S and closing of the parallel contactor P2, the generator separately excited field winding SP will be reconnected to the battery B and the discharge resistor SHR will be shunted out of the generator shunt field circuit to cause the power output of the generator to the motors to be again increased to the original value in the following manner.

Bridging of the lower pair of fixed contacts of the parallel contactor P2 causes the winding of the contactor SHC to be energized through the following conductors: motor control conductor 27, conductors 33, 31 and 17 to the negative control conductor NC, to cause closure of this contactor which then causes the contactor SPC to be energized and close in the manner described previously.

Bridging of the central pair of fixed contacts of the contactor P2 causes the conductors 55 and 57 to be connected thereby setting up a circuit to be described subsequently, which is completed upon the next or third successive closure of the relay V1 due to an increase in the speed of the locomotive to again cause energization and closure of the motor field shunting contactors MFS1 and MFS2 to further increase the torque and speed range of the motors and thereby cause the motors and locomotive to operate at maximum speed.

After transition of the motor connections the current output of the generator to the motors is again increased and their torque and speed will increase. When the voltage applied to the motors and relay V2 again increases to a value of 700 volts the relay V2 will close a second time and again open the shunt circuit across the windings of the motor field shunting contactors MFS1 and MFS2 in the same manner as described previously. Upon a further increase in the motor and locomotive speed to a value of 50 M. P. H. the value of voltage applied to the motors and winding of relay V1 will be 850 volts, and the relay V1 will close the third time to again cause energization and closure of the contactors MFS1 and MFS2 through the bridged lower contacts of the relay V1, the bridged contacts second from the bottom of contactor MFS1, the bridged central pair of fixed contacts of the contactor P2, and conductors PC, 47, 49, 51, 53, 55 and 57, resistor 59 and conductors 63, 65, 67, 69 and negative control conductor NC, to cause the motors to be connected in the parallel-shunt power relation with the generator and to operate and drive the locomotive at maximum speed.

*Automatic operation for decreasing speed of the locomotive*

Upon a decrease in the locomotive from the maximum speed value to a speed of 45 M. P. H. due to an increase in the load thereon the voltage applied to the motors and winding of relay V2 will decrease to a value of 600 volts and cause the relay V2 to be de-energized and open to complete the shunt circuit across the windings of the motor field shunt contactors MFS1 and MFS2 and cause de-energization thereof, causing these contactors to open and change the motor connection from the parallel-shunt power relation back to the straight parallel power connection relation with the generator. The shunt connection established across the windings of the contactors MFS1 and MFS2 comprises the conductors 67 and 71 and 57 which are connected by bridging of the fixed contacts of the relay V2 by the armature contact.

Transition backward from the parallel motor connection relation to the series-shunt relation may be accomplished manually by opening of the forestalling switch FS. When the forestalling switch FS is opened the forestalling relay is de-energized and opens, to open the single energizing connection to the winding of the relay PR2, comprising the conductors 93 and 91, and the relay PR2 accordingly opens to break the previously described energizing connection to the parallel contactors P1 and P2. The connection arrangement shown makes it necessary that the forestalling switch FS be closed to cause energization and closure of the forestalling relay FR to permit energization and closure of the relay PR2 in order to cause energization and closure of the parallel contactors P1 and P2 to complete the parallel motor connection relation. When the parallel contactor P1 opens, the series contactor is energized through the bridged lower fixed contacts of the contactor P1, and the series contactor accordingly closes to connect the motors in series relation with the generator and causes de-energization of the contactor P2 by opening of the lower fixed contacts of the series contactor S.

The motor field shunting contactors MFS1 and MFS2 will close if the locomotive speed is above 18 M. P. H., which causes energization of the relays V1 and V2, as described previously.

Automatic change in the motor connection relation between the motor series-shunt and series power relations takes place at 12 M. P. H. upon de-energization of the relay V2, as previously described.

In order to disconnect the motors from the generator and to decrease the output of the power plant the master controller handle is moved to a position to disconnect the motor control conductor 27 from the conductor 19 connected to the positive control conductor PC to cause de-energization of contactors S, SHC and SPC, which causes their armatures to move to the position shown, which, as previously described, opens the motor series power connection relation with respect to the generator and causes the output of the generator to be reduced to a negligible value. As also previously described, with the controller in this position the power operated means PO adjusts the governor speed setting means to cause operation of the engine at idling speed.

It will be evident that transition from the parallel-shunt motor connection to the series-shunt connection can be made by opening the forestalling switch and that the motors may be disconnected from the generator at any speed of the locomotive by moving the handle of the master controller back to the position at which the power plant is caused to run at idling speed and negligible output.

The electrical constants of the series, series-shunt, parallel and parallel-shunt power circuits are such that if the connections are changed at the values of speed and corresponding values of voltage specified, overloading of the engine-generator power plant and motors will be prevented, as the available power output of the power plant is maintained equal to the power demand of the motors by the governor, and current surges and resulting torque surges are held to a minimum value, as they cause changes in the motor circuit relations at proper values of voltage and speed for the particular circuit relations changed. It will be evident that for other circuit relations the automatic control means may be adjusted to cause operation similar to that described above.

I claim:

1. A locomotive generating electric drive and control system comprising a prime mover generator power plant, traction motors supplied with power from the power plant, speed, load and output regulating means for the power plant, excitation reducing means for the motors, a power circuit including switching means for connecting the motors in different circuit relations with the power plant generator, automatic control means for said motor excitation reducing means and said switching means, said automatic control means acting in response to different preselected values of voltage of the generator corresponding to variations in the speed and load on the motors for each motor circuit relation with and without the excitation of the motors reduced, automatically to reduce and increase the motor excitation for each motor circuit relation and to cause a change from one motor circuit relation to the other automatically, and manually operable control means for controlling the power plant speed, load and output regulating means and for controlling said switching means in order to establish one motor circuit relation and thereby permit operation of said automatic control means.

2. A locomotive generating electric drive and control system comprising a prime mover generator power plant, speed, load and output regulating means therefor, traction motors supplied with power from said power plant generator, motor excitation reducing means, power connections including switching means for connecting the motors in different circuit relations with the generator, manually operable control means for said power plant regulating means and said switching means to establish one motor circuit relation with the generator when the power plant is caused to operate at high speed, load and output, automatic control means acting in response to preselected values of generator voltage corresponding to different values of motor speed and load for each of said motor circuit relations with or without the motor excitation reducing means operative, said automatic means being connected to said motor excitation reducing means and said switching means by interlocking and control connections so that the motor excitation may be automatically increased or decreased for each motor circuit relation and so that the circuit relation established by the manually operable means is automatically changed to another circuit relation by said automatic control means to increase the speed and torque range of the motors without overloading the power plant, and manually controlled forestalling means to prevent control of said motor excitation reducing means and said switching means by said automatic control means.

3. A locomotive generating electric drive and control system comprising a prime mover generator power plant, power plant speed, load and output regulating means, excitation reducing means for the power plant generator, series traction motors for driving the locomotive, shunting means for the motor field windings, power connections including switching means for connecting the motors in series or parallel relation with the generator, automatic control means acting in sequence and in response to preselected values of generator voltage corresponding to different values of motor and vehicle speed with the motors connected in either series or parallel relation either with or without the motor fields shunted to control the motor field shunting means and also to control the switching means and generator excitation reducing means simultaneously to cause transition from the series motor connection with the motor fields shunted to the parallel motor connection relation, and a manually operable controller for controlling said switching means and power plant speed, load and output regulating means to jointly establish the series motor connection relation and to vary the power supplied to the motors to cause variation in the speed and torque thereof and operation of the automatic control means in the manner described.

4. A generating electric drive and control system for a vehicle comprising a prime mover generator power plant, output regulating means therefor, excitation reducing means for the power plant generator, a plurality of vehicle traction motors, field shunting means for the motors to increase the inherent speed and torque range thereof, a power circuit between the generator and motors which include means for connecting the motors in a series or parallel relation with the generator, automatic control means for the motor field shunting and connecting means adapted to act at preselected values of generator voltage corresponding to different values of speed of the motors for each of said motor connection relations to control said motor field shunting means to increase the speed and torque range of the motors and to act when the motors are connected in series relation with their fields shunted to control both said generator excitation reducing means and said motor connecting means to simultaneously cause a reduction in the generator output to the motors and transition of the motor connections to the parallel connection relation, and manually operable control means jointly controlling the motor connecting means and power plant output regulating means to establish the series connection relation when the power plant is caused to operate at minimum output.

5. A generating electric drive and control system for a vehicle comprising a prime mover generating power plant, speed and torque varying means for the prime mover, excitation varying means for the generator to vary the load on the prime mover, prime mover speed responsive means for actuating both the prime mover speed and torque varying means and generator excitation varying means to cause operation of the power plant at constant output, means for varying the speed response of the speed responsive means to vary the speed, load and output of the power plant, vehicle traction motors for driving the vehicle, a power circuit including switching means for the connection of the motors in series or parallel relation with the generator and field shunting means for the motors, and control means comprising a manually operable master controller for jointly controlling the switching means and the means varying the speed response of the speed responsive means to cause the motors to be initially connected in series relation with the generator and thereafter to cause operation of the power plant and increasing values of power output to the motors and automatic control means responsive to preselected values of generator voltage corresponding to different increasing values of the motor and vehicle speed to automatically control the generator excitation varying means and switching means in a proper sequence to initially cause the motor fields to be shunted when the motors are connected in series relation, to next cause transition between the series and parallel motor connection relations and a drastic reduction in the generator excitation and power supplied to the motors by the generator during transition of the connections and to finally cause the motor fields to be shunted when in the parallel connection relation, the above sequence of operation causing the motors and vehicle to be accelerated from rest to maximum speed with minimum shock to the vehicle and driving means therefor.

6. A locomotive generating electric drive and control system comprising a plurality of series traction motors, field shunting means therefor to vary the normal speed and torque range thereof, a prime mover generator power plant for the motors, speed, load and output varying means for the power plant, generator excitation reducing means to substantially reduce the power supplied to the motors, motor connecting means for relating the motors in a series or parallel relation with the generator, manual control means for the power plant output regulating means and motor connecting means to initially cause the motors to be connected in series relation and the output of the power plant to be thereafter increased, an automatic counting relay system acting in response to preselected values of generator voltage resulting from an increase in the speed of the motors and vehicle to control the motor field shunting means, generator excitation varying means and motor connecting means to successively cause the motor fields to be shunted when the motors are connected in series relation, to cause next a simultaneous reduction in the generator excitation and transition of the motors to the parallel connection relation and finally to cause the motor fields to be shunted when the motors are connected in parallel relation.

7. A locomotive generating electric drive and control system comprising a plurality of series traction motors, field shunting means for the motors, a prime mover generator power plant, speed, load and output regulating means for the power plant, generator excitation interrupting means, a power circuit between the generator and motors including contactors for connecting the motors in a series-parallel or parallel relation with the generator, manual control means for initially controlling the contactors for establishing the series-parallel motor connection and for controlling the output regulating means of the power plant, and automatic control means acting in response to variations in the generator voltage resulting from variations in the speed of the motors for jointly controlling the generator excitation interrupting means and contactors in order to cause transition from the series-parallel to the parallel connection to increase the speed and torque range of the motors without imparting shocks to the motors, said automatic means also acting at corresponding values of voltages but at different values of motor and vehicle speeds for each of the motor connection relations to control the motor field shunting means in order also to increase the speed and torque range of the motors for each motor connection relation and to reduce the current surges and therefore the shocks imparted to the locomotive when transition of the motor connections is accomplished by the automatic control means.

8. A locomotive generating electric drive and control system comprising a prime mover generator power plant, speed, load and output regulating means therefor, said power plant generator having self and separately excited fields and excitation reducing means associated therewith for reducing the excitation current in said fields to a negligible value, a plurality of pairs of traction motors permanently connected in series relation, excitation varying means for said motors, a power circuit between the motors and generators including switching means for connecting pairs of motors in series or parallel relation, an automatic counting relay system comprising a plurality of relays acting in succession at different preselected values of generator voltage corresponding to variation in the speed of the motors when the motors are connected in series or parallel relation with or without the motor fields shunted, a plurality of control relays interconnected with said voltage relays and also with said generator excitation reducing means, said motor excitation varying means and said switching means in such manner that control and holding circuits are successively set up and completed to cause operation of the motor excitation varying means prior to and after simultaneous operation of the switching means and generator excitation reducing means by action of said automatic counting relay mechanism to cause transition between the series and parallel motor connection, the above sequence of operation by said automatic counting relay system causing successive variations in the speed and torque range of the motors without overloading the generator or without causing shocks on the motors or generator, and manually operable control means for jointly controlling the power plant output regulating means and the switching means to vary the generator power output to the motors and to establish the series motor connection relation.

9. A locomotive drive and control system comprising a power plant including a generator, a plurality of traction motors, excitation reducing means for the motors, circuit connections between the generator and motors including switching means for changing the motor circuit connections with respect to the generator and for controlling the motor excitation means, manual means for controlling the switching means to establish one motor connection relation, and means acting in response to the changes in the generator and motor voltage for automatically controlling the switching means to cause a change in motor circuit relations and to cause the motor excitation to be reduced in proper sequence.

10. A locomotive drive and control system comprising a power plant including a generator, output regulating means for the power plant, a plurality of traction motors, excitation varying means for the motors, circuit connections between the generators and motors including switching means to change the motor circuit relations with respect to the generator and to render the motor excitation varying means operative, manual means for controlling the switching means to establish one motor circuit relation with the generator and to control the power plant output regulating means, and means responsive to generator voltage to control the switching means and power plant output regulating means simultaneously and for separately controlling the motor excitation means to prevent overloading and shocks on the power plant and motors.

11. A locomotive drive and control system comprising a power plant including a generator, generator output regulating means, a plurality of traction motors, motor excitation regulating means, circuit connections between the generator and motors including switching means to change the motor circuit relations and to render the generator and motor excitation regulating means operative, manual means for controlling the switching means to establish a circuit relation between the generator and motors, means responsive to generator voltage to control the switching means to jointly cause the motor circuit relations to be changed and to cause operation of the generator excitation regulating means, said voltage responsive means also acting to control the switching means to cause operation of the motor excitation regulating means for each motor circuit relation, and manual means to render the voltage responsive means inoperative.

STUART H. COWIN.